(12) United States Patent
Craske (10) Patent No.: US 9,547,596 B2
(45) Date of Patent: Jan. 17, 2017

(54) HANDLING OF A WAIT FOR EVENT OPERATION WITHIN A DATA PROCESSING APPARATUS

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 1925 days.

(21) Appl. No.: 12/654,617

(22) Filed: Dec. 24, 2009

(65) Prior Publication Data

US 2011/0161599 A1 Jun. 30, 2011

(51) Int. Cl.
*G06F 12/08* (2016.01)
*G06F 9/52* (2006.01)

(52) U.S. Cl.
CPC ............ *G06F 12/0831* (2013.01); *G06F 9/52* (2013.01); *G06F 12/0815* (2013.01); *Y02B 60/1225* (2013.01)

(58) Field of Classification Search
CPC .... G06F 12/0831; G06F 9/52; G06F 12/0815; G06F 12/08; Y02B 60/1225
USPC ......................................................... 711/141
See application file for complete search history.

(56) References Cited

U.S. PATENT DOCUMENTS

| | | | | |
|---|---|---|---|---|
| 6,049,851 A * | 4/2000 | Bryg et al. | | 711/141 |
| 6,636,906 B1 * | 10/2003 | Sharma et al. | | 710/22 |
| 7,162,590 B2 * | 1/2007 | Pruvost et al. | | 711/147 |
| 7,249,270 B2 | 7/2007 | Mansell et al. | | |
| 7,320,054 B2 * | 1/2008 | Matsuura et al. | | 711/141 |
| 7,398,360 B2 * | 7/2008 | Hetherington et al. | | 711/141 |
| 2009/0172294 A1 * | 7/2009 | Fryman et al. | | 711/141 |

OTHER PUBLICATIONS

Jim Handy, "The Cache Memory Book: The Authoritative Reference on Cache Design", Second Edition, 1998, pp. 140 and 204.*
J. Goodacre, "ARM11 MPCore and its impact on Linux Power Consumption".

* cited by examiner

*Primary Examiner* — Christopher D Birkhimer
(74) *Attorney, Agent, or Firm* — Nixon & Vanderhye P.C.

(57) ABSTRACT

A data processing apparatus forms a portion of a coherent cache system and has a master device for performing data processing operations including a wait for event operation causing the master device to enter a power saving mode. A cache stores data values for access by the master device when performing the data processing operations. Coherency handling circuitry is responsive to a coherency request from another portion of the coherent cache system, to detect whether a data value identified by the coherency request is present in the cache, and if so, to cause a coherency action to be taken in respect of that data value stored in the cache. Wake event circuitry issues a wake event to the master device if the coherency action is taken, and the master device exits the power saving mode.

9 Claims, 5 Drawing Sheets

HANDLING OF A WAIT FOR EVENT OPERATION WITHIN A DATA PROCESSING APPARATUS

TECHNICAL FIELD

The technical field relates to techniques for handling of a wait for event operation within a data processing apparatus, and in particular to the handling of such a wait for event operation within a data processing apparatus forming a portion of a coherent cache system.

BACKGROUND

It is known to provide multi-processing systems in which two or more master devices, for example processor cores, share access to shared memory. Such systems are typically used to gain higher performance by arranging the different processor cores to execute respective data processing operations in parallel. Known data processing systems which provide such multi-processing capabilities include IBM370 systems and SPARC multi-processing systems. These particular multi-processing systems are high performance systems where power efficiency and power consumption is of little concern and the main objective is maximum processing speed.

It should be noted that the various master devices need not be processor cores. For example, a multi-processing system may include one or more processor cores, along with other master devices such as a Direct Memory Access (DMA) controller, a graphics processing unit (GPU), etc.

In order to control access to various shared resources within the shared memory, it is known to use semaphores. A semaphore is a protected variable or abstract data type used to restrict access to a shared resource in a multi-processing system environment. The value of a particular semaphore identifies the status of a shared resource, and through the use of such semaphores it is possible to maintain an ordering between certain data processing operations being performed by one master device and other data processing operations being performed by another master device.

For example, if one master device is being used to perform one or more setup operations resulting in the storing of certain data values in memory which will then be used by another master device, a semaphore may be provided in memory which is set by the first master device when it has completed its setup operations, with the other master device polling that semaphore, and only proceeding to perform its associated data processing tasks once the semaphore has been set. In other examples, particular semaphores can be directly associated with particular data structures in memory, for example particular data values, buffers, etc. The semaphores can take a variety of forms, from a simple lock value which is either set or unset, to counter values where each counter value indicates a different state of the associated shared resource. In other examples, the semaphore can take the form of a pointer. For example, considering a shared resource in the form of a circular buffer, one master device producing data to be stored in that buffer may maintain a write pointer as a semaphore, whilst another master device acting as a consumer of the data in that buffer may maintain a read pointer as a semaphore. Both master devices may use the values of the read and write pointers to control their operations, so as to ensure that the actions of both master devices stay synchronised.

It will be appreciated from the above discussion that, dependent on the value of a semaphore accessed by a particular master device, that master device may determine that it cannot currently perform the data processing tasks that it is waiting to perform, and often in such situations the master device may determine that it cannot do anything except wait for the semaphore value to change to a value that allows it to continue processing. For example, if a processor is handling an interrupt from a device, it may need to add data received from the device to a shared queue. If another processor is removing data from the queue, the first processor must wait until the queue is in a consistent state and the associated semaphore (typically a lock) has been released before it can set the semaphore and add the new data to the queue. It cannot return from the interrupt handler until the data has been added to the queue, and hence it must wait.

In circumstances such as these, it is known to provide a "spin-lock" mechanism. In accordance with this mechanism, a master device requiring access to a protected shared resource will continually poll the semaphore until the semaphore has a value which indicates it can proceed. Typically, the master device will then set the semaphore to a value indicating it now has access to the shared resource.

In a multi-processing system where low power consumption is desirable, this continual polling of the semaphore is undesirable because energy is consumed to no useful effect, and additionally in systems implementing multi-threading, the execution of spin-locks by waiting threads may be highly detrimental to performance.

As discussed in commonly assigned U.S. Pat. No. 7,249,270, the entire contents of which are hereby incorporated by reference, it is known to provide a master device with the ability to execute a wait for event operation, whereby the master device enters a power saving mode until an event is received at an event input port of that master device, whereupon the master device wakes up. In the above described patent, this process is used as mechanism for conserving energy in the above-mentioned spin-lock situation. However, if a master device enters such a power saving mode of operation, it is clearly important to provide a mechanism to enable that master device to be woken when the semaphore value changes, and hence the master device may be able to continue its operation. In U.S. Pat. No. 7,249,270, this is achieved by arranging for the other master devices in the system to issue a notification over a dedicated path when they update the value of a semaphore, for example when they clear a semaphore lock to identify that they no longer require access to a particular shared resource. Such notifications are issued by the master devices via performance of a send event operation (in U.S. Pat. No. 7,249,270, such send event operations being performed by execution of a send event (SEV) instruction). A number of problems can arise with such an approach.

Firstly, software programming errors may fail to take account of write latencies within the data processing system, due for example to the use of write buffers within master devices. This may result in a first master device that is releasing the lock for a particular shared resource issuing a send event to a second master device which is currently in the power saving mode, with that second master device then waking up and polling the lock before the state of the lock has actually been changed, due to a delay incurred by draining of the write buffer. In that scenario, the second master device that has woken up and repolled the lock will see that the lock is still set, and will then go back to sleep, but will not receive any further send event notification. Typically the second master device will eventually wake up due to other stimulus, for example receipt of an interrupt, but this problem can clearly give rise to a significant performance impact by causing master devices to spend more time offline than necessary.

Another problem is that such an approach assumes that all of the master devices capable of updating semaphores have also been provided with SEV capability, and hence will issue send event notifications when updating semaphores in order to wake up any master devices that are currently in a power saving mode following performance of a wait for event operation. Whilst this may not be a problem in a symmetric multi-processing system, where multiple (typically identical) processor cores share access to memory, it is more likely to be an issue in heterogeneous systems where the various master devices may be different, for example one or more processor cores, a DMA engine, a GPU, etc.

Another issue is that the send for event notification generated in response to execution of an SEV instruction is typically broadcast globally to all of the other master devices, potentially causing spurious wake up of those master devices, resulting in unnecessary power consumption incurred by those master devices waking up, repolling the semaphore of interest to them, determining that there is no change of status in their semaphore, and then re-entering the power saving state.

Accordingly, it would be desirable to provide an alternative mechanism for waking up a processor that has entered a power saving mode following performance of a wait for event operation, which does not suffer from the above disadvantages associated with the use of SEV instructions.

Entirely separate to the issue of semaphore usage within multi-processing systems, it is known to provide one or more of the master devices with their own local cache in which to store a subset of the data held in the shared memory so as to improve speed of access to data within such multi-processing systems. Whilst this can improve speed of access to data, it complicates the issue of data coherency. In particular, it will be appreciated that if a particular master device performs a write operation with regards to a data value held in its local cache, that data value will be updated locally within the cache, but may not necessarily also be updated at the same time in the shared memory. In particular, if the data value in question relates to a write back region of memory, then the updated data value in the cache will only be stored back to the shared memory when that data value is subsequently evicted from the cache.

Since the data may be shared with other master devices, it is important to ensure that those master devices will access the up-to-date data when seeking to access the associated address in shared memory. To ensure that this happens, it is known to employ a cache coherency protocol within the multi-processing system to ensure that if a particular master device updates a data value held in its local cache, that up-to-date data will be made available to any other master device subsequently requesting access to that data. The above type of multi-processing system, where multiple master devices share data, use caches to improve performance, and use a cache coherency protocol to ensure that all of the master devices have a consistent view of the data, is often referred to as a coherent cache system.

The use of such cache coherency protocols can also give rise to power consumption benefits by avoiding the need for accesses to memory in situations where data required by a master device can be found within one of the caches, and hence accessed without needing to access memory.

In accordance with a typical cache coherency protocol, certain accesses performed by a master device will require a coherency operation to be performed. The coherency operation will cause a coherency request to be sent to the other master devices identifying the type of access taking place and the address being accessed. This will cause those other master devices to perform certain coherency actions defined by the cache coherency protocol, and may also in certain instances result in certain information being fed back from one or more of those master devices to the master device initiating the access requiring the coherency operation. By such a technique, the coherency of the data held in the various local caches is maintained, ensuring that each master device accesses up-to-date data. One such cache coherency protocol is the "Modified, Owned, Exclusive, Shared, Invalid" (MOESI) cache coherency protocol.

Cache coherency protocols will typically implement either a write update mechanism or a write invalidate mechanism when a master device seeks to perform a write operation in respect of a data value. In accordance with the write update mechanism, any cache that currently stores the data value is arranged to update its local copy to reflect the update performed by the master device. In accordance with a write invalidate mechanism, the cache coherency hardware causes all other cached copies of the data value to be invalidated, with the result that the writing master device's cache is then the only valid copy in the system. At that point, the master device can continue to write to the locally cached version without causing coherency problems.

Within such coherent cache systems, it is typically the case that local caches continue to service coherency requests even if the associated master device is idle or in a power saving state. For example, the Powerpoint presentation "ARM11 MPCore and its impact on Linux Power Consumption" by J Goodacre, ARM Limited, available on the internet at http://elinux.org/images/7/76/MPCore_and_Linux_Power.pdf describes a multi-processing system where a processor can perform a wait for event operation to enter a power saving state, but with the associated local cache still able to service coherency requests.

SUMMARY

Viewed from a first aspect, a data processing apparatus for forming a portion of a coherent cache system, comprises a master device configured to perform data processing operations, including a wait for event operation causing the master device to enter a power saving mode; a cache coupled to the master device and arranged to store data values for access by the master device when performing said data processing operations; cache coherency circuitry, responsive to a coherency request from another portion of the coherent cache system, to detect whether a data value identified by the coherency request is present in the cache, and if so to cause a coherency action to be taken in respect of that data value stored in the cache; and wake event circuitry, responsive to the cache coherency circuitry, to issue a wake event to the master device if the coherency action is taken; the master device being responsive to the wake event to exit the power saving mode.

The inventor observed that many modern multi-processing systems provide local caches in association with one or more of the master devices, and operate as a coherent cache system. Having further noted that coherency requests typically continue to be serviced by a cache even when its associated master device has entered a power saving mode following performance of a wait for event operation, the inventor determined that the performance of a coherency action within such a cache in response to a coherency request received from another portion of the coherent cache system could serve as a useful trigger to wake the master device from the power saving mode. Hence, wake event circuitry is provided which is responsive to the cache coherency circuitry, to issue a wake event to the master device if a coherency action is taken within the cache in response to the coherency request (i.e. a hit is detected within the cache in response to the coherency request hence initiating a coherency action).

Since such a mechanism does not rely on the ability of each of the master devices within the coherent cache system to be able to issue send event notifications, it is applicable to all hardware implementations of a coherent cache system irrespective of the type of master devices provided within the coherent cache system. Further, the wake event is not broadcast to all master devices, but instead is sent from the cache to its associated master device, hence reducing the problem of spurious wake up of master devices in response to broadcast send event notifications. Further, such a mechanism is more robust to software programming errors since the wake event is generated automatically as part of implementation of the cache coherency protocol. That same cache coherency protocol will also ensure that any request for data made by the master device once it has woken up results in that master device obtaining the most up to date data.

A reliable mechanism is thus provided for waking up a master device in situations where a change in state within the coherent cache system that it would be appropriate for the master device to be aware of will result in the performance of a coherency action within its associated cache. This may be the case in a variety of situations. However, in one embodiment this mechanism is used when the master device has entered the power saving mode waiting for a change in state of a semaphore. In particular, in one embodiment, during performance of said data processing operations, the master device is arranged to perform an access operation to access a semaphore stored in shared memory, the shared memory being shared with at least one further master device within the coherent cache system, and the semaphore being used to maintain an ordering between one or more data processing operations performed by the master device and one or more data processing operations performed by the at least one further master device. In such embodiments, performance of the access operation causes a current value of the semaphore to be stored in the cache, and if the current value obtained by the access operation indicates a stall condition, the master device is arranged to perform the wait for event operation.

In particular, the inventor observed that within a coherent cache system, a read access to a particular semaphore by the master device will typically result in the current value of that semaphore being cached within the master device's local cache. If as a result of that process, the master device determines that it cannot proceed further, and hence performs the wait for event operation in order to enter the power saving state, the presence of the cached version of that semaphore in the local cache provides a reliable mechanism for waking up the master device in due course. In particular, any other master device that is using that semaphore will in due course update the value of that semaphore by issuing a write request, and this will trigger a coherency operation within the coherent cache system resulting in a coherency request being sent to the cache. Since there will then be a hit in the cache, this will cause a coherency action to be taken, and the taking of such a coherency action can then be used by the wake event circuitry to issue a wake event to the master device. Such a mechanism provides a very reliable way of waking up the master device when the semaphore is updated, without waking up the master device unnecessarily (for example due to other semaphores being updated), and with the wake event only being sent to the particular master device (i.e. avoiding the inefficiencies with the broadcast of send event notifications in the earlier described prior art).

The technique of example embodiments can be reliably used irrespective of the form of the cache coherency protocol employed by the coherent cache system. However, in one embodiment, the coherent cache system employs a write invalidate cache coherency protocol, such that if the coherency request received by the cache coherency circuitry is in response to a write operation performed by a further master device within the coherent cache system, the coherency action taken in response to detection of the identified data value in the cache is an invalidation coherency action resulting in invalidation of that data value in the cache. In such an embodiment, the wake event circuitry is arranged to issue the wake event to the master device if the invalidation coherency action is taken.

When using a write invalidate cache coherency protocol, any write operation performed by a further master device (such as would occur when updating a semaphore) will result in an invalidation being performed in respect of an entry in the cache if that entry stores a copy of data that is the subject of the coherency request (as for example would be the case had the master device entered the power saving state following a read access of a semaphore and a determination that the current value of the semaphore precluded any further action by the master device). In such instances, rather than the wake event circuitry issuing a wake event whenever any coherency action is taken, the wake event circuitry may be arranged to only issue a wake event if an invalidation coherency action is taken.

Considering embodiments where the master device has cached a local copy of a semaphore prior to performing the wait for event operation and hence entering the power saving state, the semaphore may be used in a variety of ways. In one embodiment, the semaphore is set by the at least one further master device when a predetermined sequence of operations has been performed by the at least one further master device, and the current value obtained by the access operation indicates the stall condition unless the semaphore has been set, whereby the master device enters the power saving mode until the semaphore is set by the at least one further master device. Such a semaphore could hence be used to ensure that the master device does not undertake a particular sequence of operations until the predetermined sequence of operations has been performed by the at least one further master device. In such a scenario, the at least one further master device may be arranged to perform one or more setup operations prior to allowing the master device to perform its operations.

In an alternative embodiment, the semaphore may be associated with a particular data structure in the shared memory, with the semaphore controlling access to the data structure by the master device and the at least one further master device. In such embodiments, the semaphore can take a variety of forms, for example a lock, a counter or a pointer.

Viewed from a second aspect, a coherent cache system comprises a data processing apparatus in accordance with the first aspect; at least one further master device; and a coherent interconnect to which the cache of said data processing apparatus is coupled and from which said coherency request is received.

Viewed from a third aspect a method of operating a data processing apparatus forming a portion of a coherent cache system is provided. The data processing apparatus comprises a master device for performing data processing operations including a wait for event operation causing the master device to enter a power saving mode. A cache is coupled to the master device and arranged to store data values for access by the master device when performing said data processing operations. The method comprises the steps of: responsive to a coherency request from another portion of the coherent cache system, detecting whether a data value identified by the coherency request is present in the cache, and if so performing a coherency action in respect of that data value stored in the cache; issuing a wake event to the master device if the coherency action is taken; and responsive to the wake event, causing the master device to exit the power saving mode.

Viewed from a fourth aspect, a data processing apparatus for forming a portion of a coherent cache system comprises master means for performing data processing operations, including a wait for event operation causing the master means to enter a power saving mode; cache means coupled to the master means for storing data values for access by the master means when performing said data processing operations; cache coherency means, responsive to a coherency request from another portion of the coherent cache system, for detecting whether a data value identified by the coherency request is present in the cache means, and if so for causing a coherency action to be taken in respect of that data value stored in the cache means; and wake event means, responsive to the cache coherency means, for issuing a wake event to the master means if the coherency action is taken; the master means for exiting the power saving mode in response to the wake event.

DESCRIPTION OF NON-LIMITING EXAMPLE EMBODIMENTS

Figure 1:
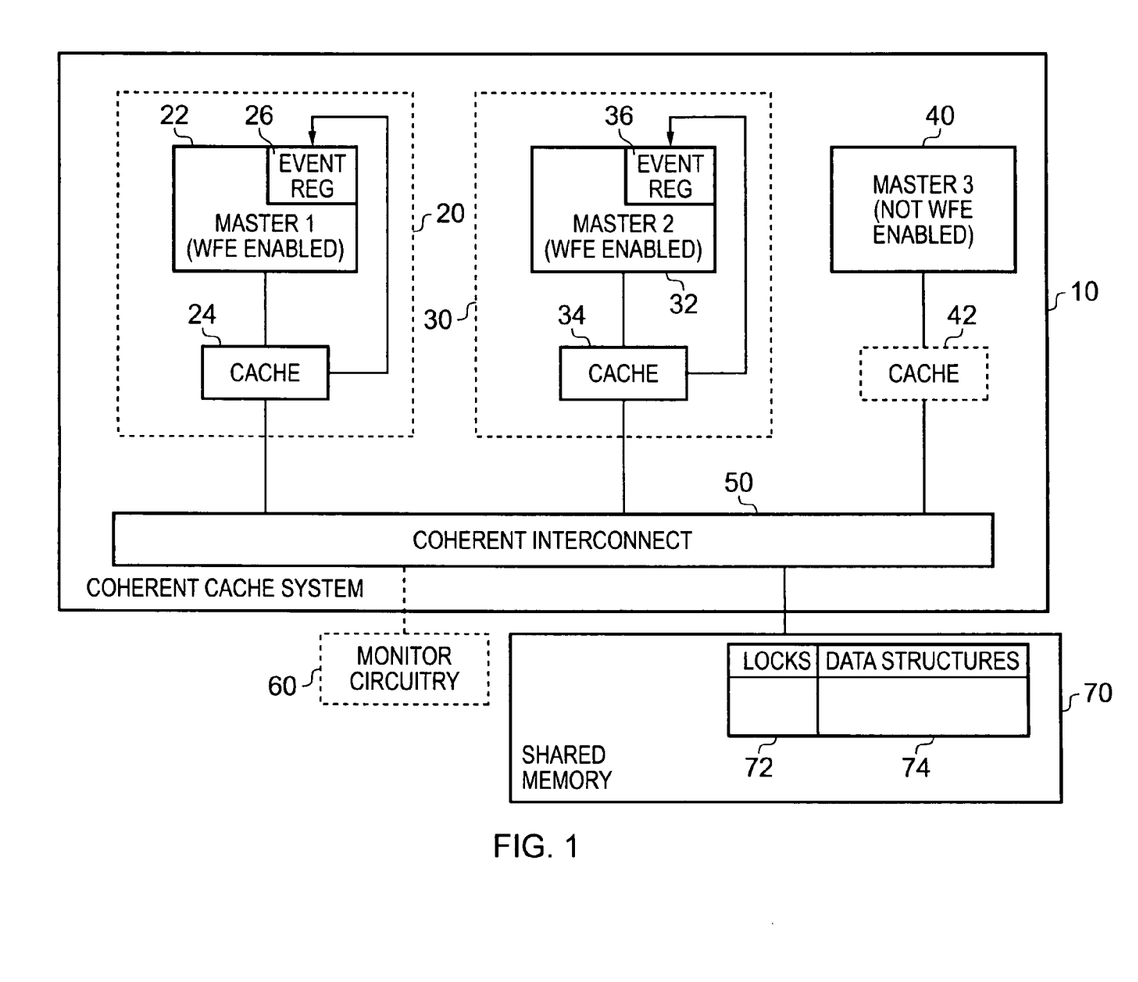
FIG. 1 is a block diagram illustrating a coherent cache system in which example embodiments may be employed.

FIG. 1 is a block diagram illustrating a coherent cache system in which example embodiments may be employed. The coherent cache system 10 comprises a coherent interconnect 50 to which a plurality of elements are connected. Each of the elements 20, 30 can be viewed as a data processing apparatus of an embodiment, forming a portion of the coherent cache system. In this example, each of the elements 20, 30 comprise a master device 22, 32 and associated level one cache 24, 34. Both of the master devices 22, 32 are wait for event (WFE) enabled, meaning that in certain situations they will execute a wait for event operation in order to enter a low power state, and will then exit that low power state when an event is received at their associated event register 26, 36, respectively.

As shown in FIG. 1, other master devices that are not WFE enabled, such as the master device 40, can also be connected to the coherent interconnect 50, either directly, or via an associated (optional) cache 42.

The master devices could all be processor cores, as for example may be the case in a symmetric multi-processing system, or alternatively may take the form of different master devices, for example a processor core, a graphics processing unit (GPU), a direct memory access (DMA) engine, etc.

The coherent interconnect 50 couples the various master devices and associated caches with shared memory 70, and optionally with one or more other peripheral devices (not shown) such as a Universal Asynchronous Receiver Transmitter (UART) device, etc.

In addition to providing the necessary interconnect structure to enable coupling between the various components connected to the coherent interconnect 50, the coherent interconnect 50 also implements a cache coherency protocol in order to ensure that whenever a master device requests access to a data value, it will access the most up-to-date version of that data value within the coherent cache system. In particular, since the data in the memory 70 is shared, it is possible that one master device 22, 32, 40 may request access to a data value which is not in its local cache but is cached in the local cache of another master device. For both read and write accesses, such cache misses will hence cause a coherency operation to be performed to see if the data is found elsewhere in the coherent cache system. For write operations, it may also be necessary to perform a coherency operation even if the data is found in the local cache. In particular, if a master device requesting a write access to the data finds the data in its own local cache, unless that cached data is marked as unique, it is still necessary to perform a coherency operation in order to make sure that the data is removed from any other caches within the coherent cache system before the update to the master device's local cache is made (otherwise those other caches would then be storing out-of-date data), or to enable the updated data to be propagated to those other caches so that they can maintain up-to-date data.

Wherever a coherency operation is required, snoop circuitry within the coherent cache system is used to issue coherency requests to each of the other caches in the coherent cache system other than any cache associated with the master device issuing the access request giving rise to the coherency operation. The caches that are subjected to a coherency request will also be referred to herein as the snooped caches. In an alternative embodiment, the snoop circuitry may maintain some local record of address ranges held in each of the caches, and based on that information can determine a subset of the caches of the coherent cache system which need to be snooped, and only then issue a coherency request to those determined subset of caches.

In one embodiment, such snoop circuitry resides centrally within the coherent interconnect 50, but in an alternative embodiment the snoop circuitry can be distributed so that different snoop circuits are associated with different caches, each of those distributed snoop circuits monitoring the accesses taking place over the coherent interconnect in order to determine when to issue coherency requests to their associated cache.

Accordingly, each snooped cache will receive a coherency request in the form of a coherent address. This will cause a coherency handler within the cache to perform a lookup in its cache array to determine whether the data value for that coherent address is stored within the cache. If not, a coherent response will be returned to the snoop circuit identifying that the data is not present. However, if it is present, then a coherency action will be performed in respect of that data value within the cache array (for example a cache line containing that data value may be invalidated), and the coherent response will identify to the snoop circuit that the data has been found and the coherency action performed.

The coherency request sent to each snooped cache can be of various different types, dependent on the type of access operation that the master device giving rise to the coherency operation is seeking to perform. For certain types of operation, the coherency request may require the snooped cache to return the data if a hit is detected, and accordingly in such cases the coherent response may be accompanied by coherent data.

The snoop circuitry collates the information received from the various snooped caches, and dependent on the responses received, may need to access memory 70 either to perform a write back operation (to complete the process of cleaning a cache line that has been invalidated where that cache line contains dirty data), or to perform a memory fetch (for example where the data has not been located in any snooped caches, and the master device requires that data in order to complete its specified access operation).

Once the snoop circuitry has received responses from all of the snooped caches, and performed any memory fetch or write back operations required, it will then send a coherency response back to the initiating master/cache, whereafter that master can then complete its access operation.

Within multi-processing systems such as those shown in FIG. 1, it is known to use semaphores to control access to various shared resources within the shared memory 70, examples of such shared resources being the data structures 74 illustrated schematically in FIG. 1. As discussed earlier, semaphores can take a variety of forms, for example locks, counters, pointers, etc. For the purposes of illustration, semaphores in the form of locks 72 are provided in association with each of the shared data structures 74. When any of the master devices 22, 32, 40 wishes to access one of the data structures 74, it must first obtain ownership of the associated lock 72. In order to obtain the lock, the master device needs to read the current value of the lock in order to assess whether it can proceed with accessing the data structure. If it can, it will then update the lock and proceed with the access. The operation of reading the lock to assess its current contents, followed by any appropriate update to the lock, needs to occur as an atomic operation, since it is important that no other master device has the opportunity to modify the value of the lock between the time it is read and the time it is modified dependent upon that read value.

In a typical system, only one master device at a time may be allowed to have access to the shared data structure. When a master device wishes to have access to the shared data structure, then it can only consider the lock to be cleared if the lock indicates that no other master device has access. If this is the case, then that master device can set the lock. Whilst the lock is set in such a manner, no other master device can obtain access to the associated data structure. When the master device having access no longer requires access to the data structure, it will then clear the lock.

As shown by the dotted box 60, in some embodiments it may be appropriate for the data processing system to incorporate monitor circuitry 60 to monitor accesses to particular locks in order to ensure that the checking of a lock value, and any subsequent setting of that lock, occur as an atomic operation.

As each of the master devices 22, 32 is WFE enabled, then if either of those master devices seeks access to a data structure, but finds that the current value of the associated lock indicates that it cannot have access at that time, it is arranged to perform a WFE operation (assuming it determines that it can perform no other useful operations until it gains access to the lock), performance of the WFE operation causing the master device to enter a power saving mode of operation and to remain in that power saving mode of operation until it receives an event at its associated event register 26, 36. The manner in which such events are generated in accordance with embodiments will be discussed in more detail with reference to FIG. 2.

Figure 2:
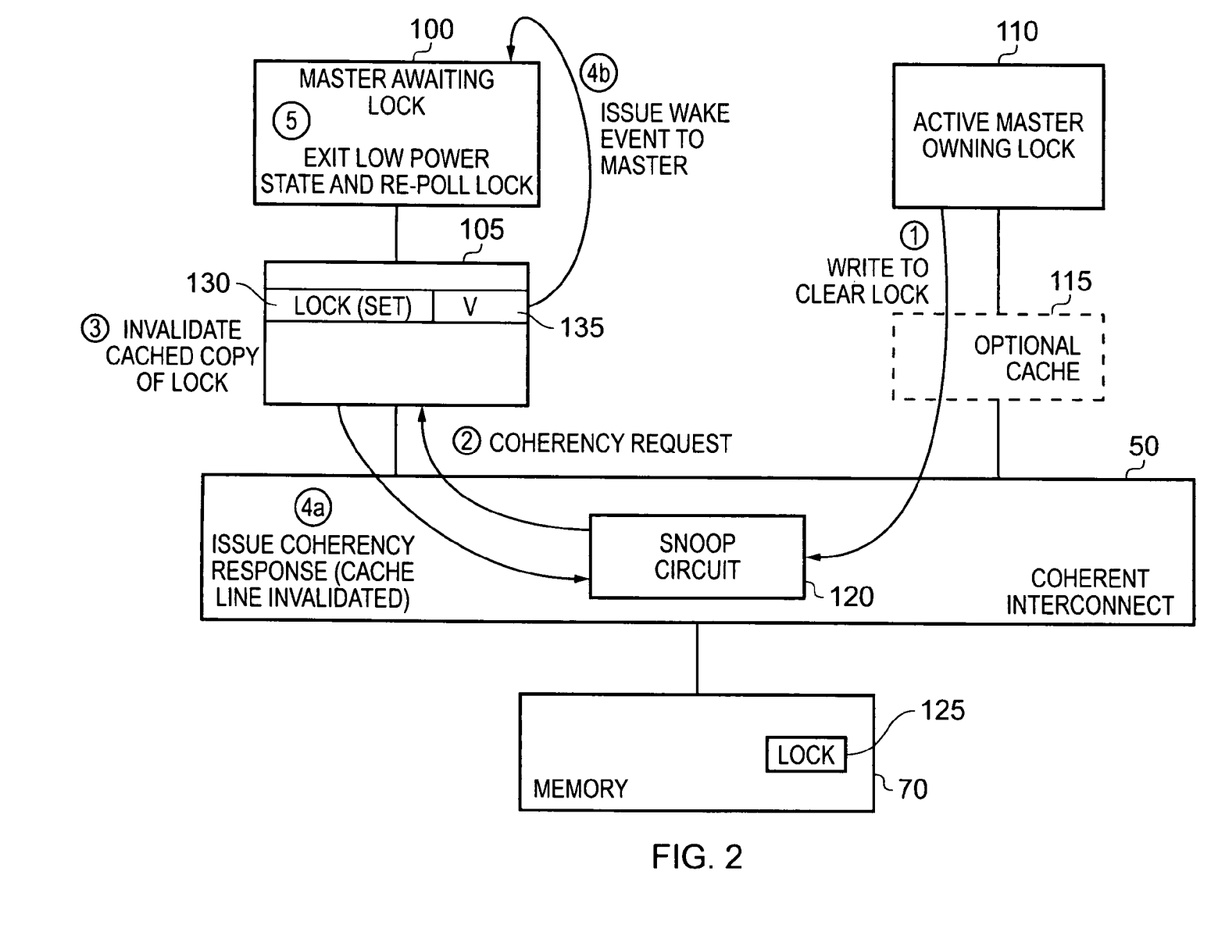
FIG. 2 illustrates how, in accordance with one embodiment, a coherency operation initiated when one master seeks to clear a lock causes a wake event to be issued to another master currently in a low power state following performance of a wait for event operation.

In the example of FIG. 2, it is assumed that one master device 100 has read the value of a lock 125 maintained in memory, determined that the value of that lock precludes it from currently accessing the associated data structure, and accordingly has executed the wait for event operation in order to enter the low power state. Since the master device 100 has an associated cache 105, the original act of reading the lock to assess its value has resulted in a copy of the lock being stored in the cache line 130 with the associated valid bit 135 being set to indicate that that cache line is valid. Whilst the master device 100 is in the low power state, its associated cache 105 is still arranged to action any coherency requests received from the coherent interconnect 50.

As also shown in FIG. 2, an active master 110 which is the current owner of the lock 125 determines at some subsequent point that it no longer requires access to the shared resource, and hence initiates a write operation to clear the lock, as indicated by line 1 in FIG. 2. Irrespective of whether the master 110 has an associated cache 115, and irrespective of whether a copy of that lock is stored within the cache 115, the issuance of that write request will cause the snoop circuit 120 to decide that a coherency operation is required. In particular, even if a copy of the lock is stored in the optional cache 115, it will not be marked as uniquely owned by that cache, due to the presence of the copy of the lock stored in the cache 105, and accordingly a coherency operation will still be required even if the lock is locally cached by the active master 110.

As part of the coherency operation, the snoop circuit 120 will issue a coherency request to the cache 105, as indicated by line 2 in FIG. 2. A coherency handler within the cache will then perform a lookup within the cache 105, will detect a hit in the cache due to the lock being stored in the cache line 130, and will accordingly perform a coherency action in response to that hit being detected. In one embodiment, it is assumed that the coherent interconnect 50 employs a write invalidate cache coherency protocol, and accordingly the coherency action taken at this point will be to invalidate the cache line 130 by clearing the valid bit 135, as indicated by numeral 3 in FIG. 2.

Thereafter, a coherency response will be issued to the snoop circuit 120 to identify that the cache line has been invalidated (as indicated by the line 4a in FIG. 2), and further wake event generation circuitry within the data cache will be triggered by the coherency action to issue a wake event to the master 100, as indicated by the line 4b. This wake event will be received by the master's associated event register, which will then trigger the master 100 to exit the low power state, and re-poll the lock 125, as indicated by the numeral 5 in FIG. 2.

Since this approach does not require each of the master devices within the coherent cache system to be able to issue send event notifications (as for example described in co-pending U.S. Pat. No. 7,249,270), it is applicable to all hardware implementations of a coherent cache system irrespective of the type of master devices provided within the coherent cache system. Further, the wake event is only sent to the actual master(s) awaiting release of the relevant lock, rather than being broadcast to all master devices. Further, such an approach is robust against software programming errors, since the wake event is generated automatically as part of implementation of the cache coherency protocol.

Figure 3:
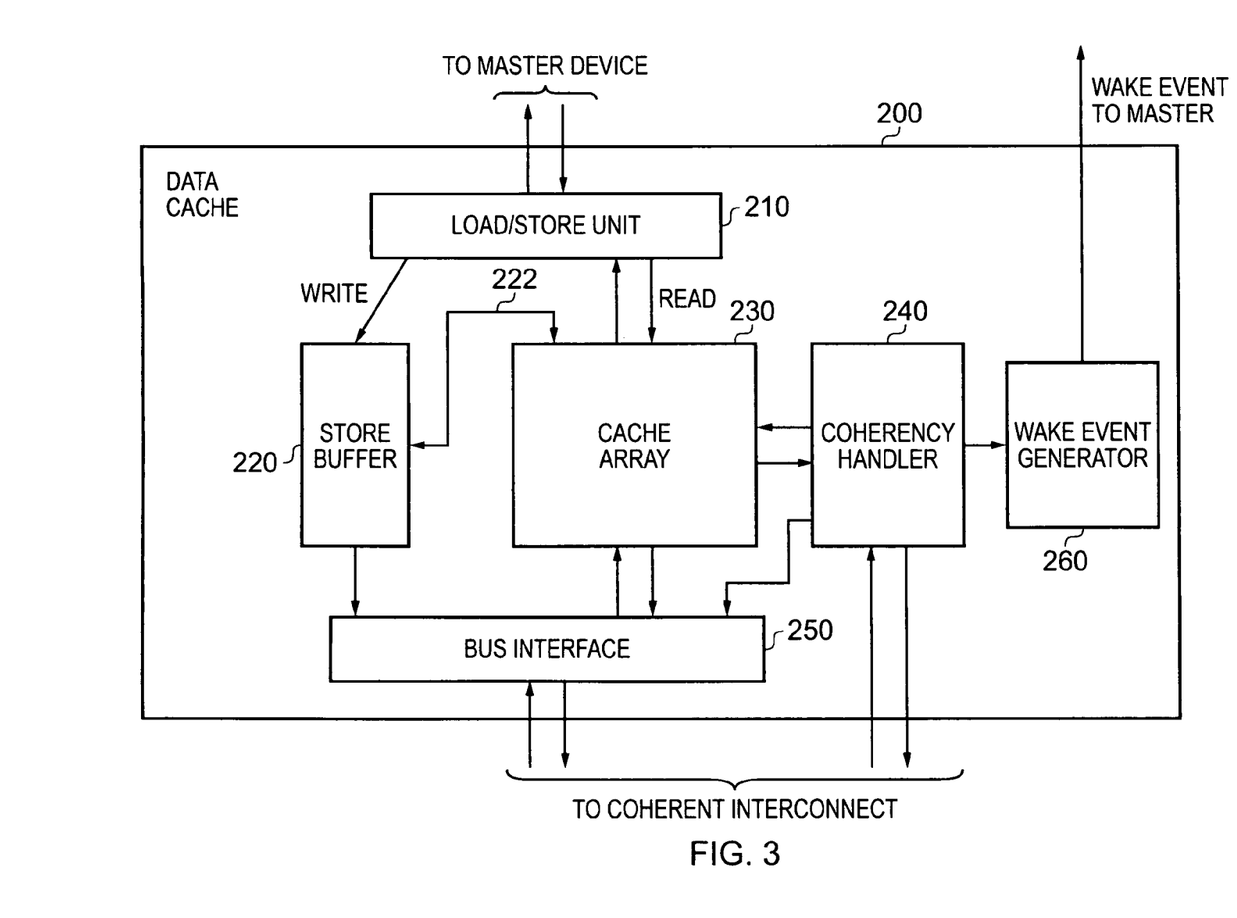
FIG. 3 is a block diagram illustrating components provided within a data cache in accordance with one embodiment.

FIG. 3 is a block diagram illustrating a data cache in accordance with one embodiment. The data cache 200 is coupled via a load/store unit (LSU) 210 with the associated master device and is arranged to receive read and write access requests from that associated master device. In the event of a read access request, that access request can be forwarded directly to the cache array 230 to enable a lookup procedure to be performed in order to determine whether the requested data value is in the cache array, if so that data value being routed back via the LSU 210 to the master device. In the event of a cache miss, a linefill request is forwarded via the bus interface 250 to the coherent interconnect to cause a cache line's worth of data including the data value of interest to be retrieved from the coherent cache system (or from memory 70 if not present in the coherent cache system) for storing in the cache array 230, whereafter the required data value is returned via the LSU 210 to the master device.

For write access requests, these are forwarded to the store buffer 220 from where they are then processed. In particular, for a cacheable access request, the store buffer may initiate a lookup via path 222 in the cache array 230 to determine whether the data value the subject of the write access request is within the cache array, and if so an update will be performed in the cache line of the cache array 230 (after initiating the earlier described coherency operation if the data is not marked as unique). In the event of a cache miss, a linefill process will be invoked by the store buffer 220 via the bus interface 250 to cause a cache line's worth of data to be retrieved from the coherent cache system (or from memory if not present in the coherent cache system) for storing in the cache array, whereafter the write update can take place within the cache array. Alternatively the cache line's worth of data is received into a linefill buffer located within the bus interface 250, the write update is then merged with that data in the linefill buffer, and thereafter the line of data will be allocated in the cache array 230.

A coherency handler 240 is also provided for receiving coherency requests from the snoop circuit and to then instigate the required coherency action in respect of the relevant line in the cache array 230. A coherency request received from the snoop circuit will typically identify the type of access instigating the coherency operation and the address of the data value the subject of the access request, in order to enable the coherency handler 240 to identify whether the relevant data value is stored within the cache array 230, and if so the appropriate action to take.

If as a result of the coherency operation, a cache line needs to be evicted from the cache array 230, the coherency handler 240 can communicate with the bus interface 250 in order to cause the required eviction to take place.

As also shown in FIG. 3, the data cache 200 includes wake event generator circuitry 260 which is responsive to an indication from the coherency handler 240 that a data value in the cache array 230 has been subjected to a coherency action (in one embodiment the wake event generator 260 being responsive to an indication that a data value in the cache array has been invalidated), to then generate a wake event which is sent to the associated master device. Accordingly, it can be seen that by such an approach, whenever a particular type of coherency action is taken by the coherency handler, the coherency handler 240 is arranged to notify the wake event generator 260 in order to cause the wake event to be generated. As will be apparent from the earlier discussion of FIG. 2, when employing a write invalidate protocol, any update to a semaphore such as a lock will cause the local copy of that semaphore in the sleeping master device's cache to be invalidated, and hence provide a reliable trigger to the wake event generator 260 to cause a wake event to be issued to the master device to cause it to wake up and subsequently re-poll the semaphore.

Figure 4:
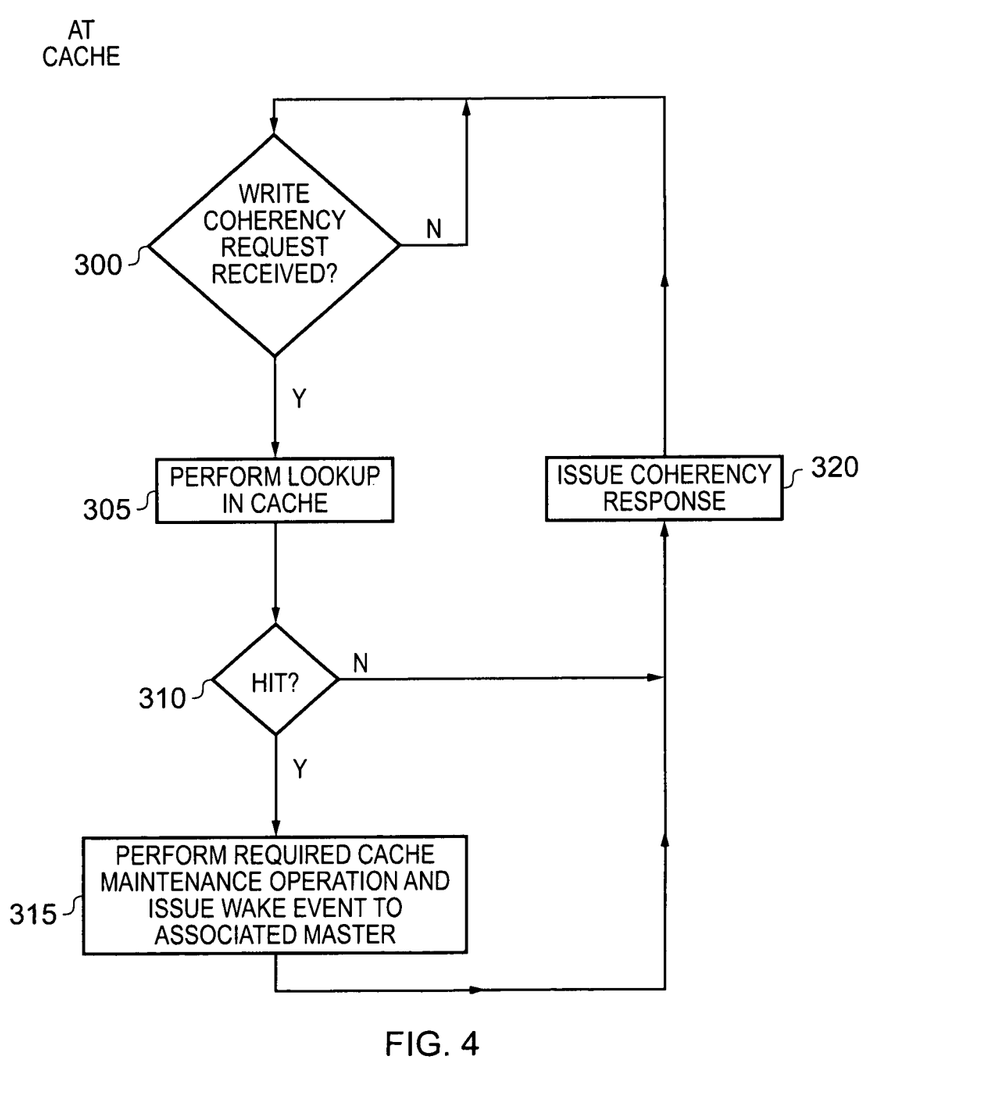
FIG. 4 is a flow diagram illustrating the steps performed by a cache when handling a write coherency request issued by the snoop circuit of FIG. 2.

FIG. 4 is a flow diagram illustrating the steps performed by the data cache upon receipt of a write coherency request. At step 300, such a write coherency request is awaited, and upon receipt, the coherency handler then performs a lookup in the cache, as indicated by step 305. At step 310, it is determined whether a hit has occurred in the cache, and if not the coherency handler merely issues a coherency response to the snoop circuitry at step 320 whereafter the process returns to step 300. However, assuming a hit is detected, then the process proceeds to step 315, where the required cache maintenance operation is performed by the coherency handler 240 in respect of the hit cache line, and the wake event generator 260 then issues the wake event to the associated master device. The process then proceeds to step 320 where a coherency response is issued by the coherency handler to the coherent interconnect, whereafter the process returns to step 300.

Figure 5:
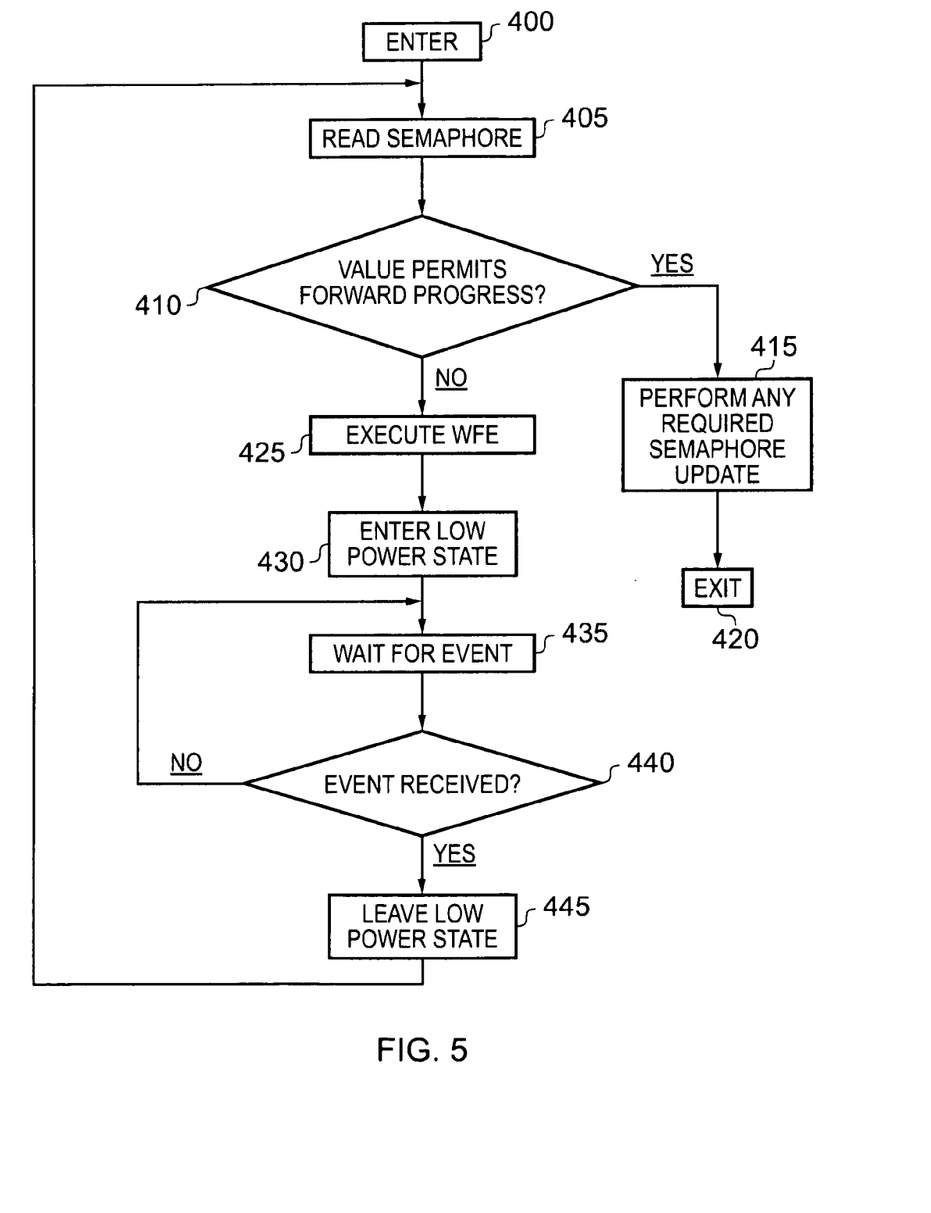
FIG. 5 is a flow diagram illustrating the operation of a master device when seeking to obtain ownership of a semaphore in accordance with one embodiment.

FIG. 5 is a flow diagram illustrating the operation of a master device in accordance with one embodiment when seeking to access a semaphore. The process is entered at step 400, whereafter a read access request is issued for the semaphore at step 405. Irrespective of whether any cache coherency operations are required in order to return the semaphore to the master device, the action of reading the semaphore will result in a copy of that semaphore being stored in the master device's local cache.

It is then determined at step 410 whether the value of the semaphore permits forward progress by the master device. The relevant value of the semaphore will depend on the type of operation the master wishes to perform. However, purely by way of example, if the semaphore is a lock, then the value of that lock will have to indicate that the lock is clear in order to allow the master device to make forward progress.

If forward progress is allowed, then the process branches to step 415 where any required semaphore update is performed. Considering the earlier lock example, this will involve setting the lock in order to take ownership of the associated data structure. Thereafter the process exits at step 420.

However, assuming it is determined at step 410 that the value of the read semaphore does not permit forward progress, then the master device will execute a WFE operation at step 425, this causing the master device to enter the low power state at step 430. Thereafter, the master device will be in a wait for event mode of operation, as indicated by step 435. In this mode of operation, the master device is awaiting receipt of an event at its event register. As indicated by box 440, until such an event is received, the master will remain at step 435, but on receipt of such an event, the process will then proceed to step 445, where the master will then exit the low power state. Thereafter, the process will return to step 405, where the master will again attempt to read the semaphore.

As will be apparent from the earlier discussion of embodiments, an event will automatically be received at step 440 when another master device updates the particular semaphore, since that update process will initiate a coherency action within the sleeping master's local cache, and that will directly trigger the event to be issued to the sleeping master to cause it to leave the low power state at step 445.

The process of FIG. 5, whereby a master device reads a semaphore in order to determine whether it can access a shared resource, enters a low power state if the semaphore indicates that it cannot access the shared resource, and then subsequently wakes up upon receipt of an event and again seeks to read the semaphore, is referred to as a spinlock operation. An example of typical spinlock code that might be executed by the master device in order to implement the process of FIG. 5 is as follows:

```
        MOV     r1, #LOCKED
Loop:
        LDREX   r0, [LOCK_ADDR]
        CMP     r0, #FREE
        BNE     Wait
        STREX   r0, r1, [LOCK_ADDR]
        CMP     r0,#OK  //ENSURE NO OTHER MASTER HAS
                        ALREADY CHANGED VALUE
        BNE     Loop
        DMB             // ORDER SUBSEQUENT
                        LOAD/STORES
        BX      lr      // RETURN
Wait:
        WFE
        B       Loop
```

In this example, the semaphore being read is a lock. A move instruction stores a "locked" value into the register r1. A loop is then entered where a load exclusive instruction reads the value of the lock from a lock address and stores that value in the register r0. The fact that the load instruction is a load exclusive instruction can be arranged to cause the monitor circuitry 60 of FIG. 1 to monitor the lock address in order to detect if any other master device seeks to access that lock address.

A compare instruction then compares the value in r0 with a value indicating a free lock. If these two values are not equal, then a branch instruction branches to the wait routine shown at the bottom of the above code. However, assuming the two values are equal, i.e. the lock is free, then a store exclusive instruction is executed. Provided no other master has modified the lock address since the load exclusive instruction was issued, the monitor 60 will allow the store operation to proceed, this causing the value in register r1 to be stored to the lock address, i.e. for the lock to be updated to indicate that it is now locked. A value is then placed in the register r0 to confirm whether the store operation was allowed to proceed or not.

The next compare instruction then compares the value in r0 with a "OK" value indicative that the store did proceed, and if the result of the comparison is not equal (i.e. the store did not proceed) then the process branches back to the top of the loop. However, assuming the comparison identified that the value in r0 does equal the OK value, then a data memory barrier instruction is performed. This orders any subsequent load and store operations, in order to ensure that the store exclusive instruction is committed to memory and visible to all other master devices before any subsequent load and store instructions after the data memory barrier instruction are performed. Thereafter, the process branches to an address identified in the link register, completing execution of the loop.

If the wait routine is initiated, this causes a wait for event instruction to be executed. Assuming there is no pending event registered in the event register of the master device, this causes the master device to enter a power saving mode, whereafter the master device will only exit the power saving mode if either an event is received at the event register, or an exception is triggered, for example by receipt of an interrupt at the master device.

When the power saving mode is subsequently exited, then the process branches back to the loop to seek to gain acquisition of the lock.

The following is an example of code that may be executed by a master device when releasing a lock:

```
        DMB
        MOV     r0, #FREE
        STR     r0, [LOCK_ADDR]
        BX      lr      //RETURN
```

Following a data memory barrier instruction to ensure that any preceding loads and stores have completed, a move instruction then stores in register r0 a value indicative of a lock being free. Then a store instruction is used to store the value in r0 to the lock address, i.e. to mark the lock as now being free. Thereafter the process returns by branching to the address in the link register.

Assuming any master devices in the coherent cache system that are WFE enabled also have an associated local cache, no further action is required when releasing a lock, since the coherency operation performed in response to the store instruction will automatically trigger a coherency action in the relevant local cache, which in turn will trigger the generation of an event to wake the master device up. However, if there are any WFE enabled masters that do not have their own local cache, then mechanisms such as the send event (SEV) instruction described in the earlier-mentioned commonly assigned U.S. Pat. No. 7,249,270 can be used. To ensure that the master is not awoken by execution of the send event instruction before the store performed in respect of the lock address has completed, it will typically be necessary to perform a Data Synchronization Barrier (DSB) instruction after the store instruction, and prior to execution of the SEV instruction. It will be appreciated that both the DSB instruction and the SEV instruction can be omitted wherever the technique of embodiments are utilised to trigger the wake event from the coherency action performed in the local cache.

Although example embodiments have been described herein, it will be appreciated that the claims are not limited thereto and that many modifications and additions thereto may be made within the scope of the claims.

I claim:

1. A data processing apparatus for forming a portion of a coherent cache system, comprising:
    a master device configured to perform data processing operations, including a wait for event operation causing the master device to enter a power saving mode;
    a cache coupled to the master device and arranged to store data values for access by the master device when performing said data processing operations;
    coherency handling circuitry within the cache, and responsive to a coherency request from another portion of the coherent cache system, to detect whether a data value identified by the coherency request is present in the cache, and if so to cause a coherency action to be taken in respect of that data value stored in the cache; and wake event circuitry within the cache, and responsive to the coherency handling circuitry, to locally issue a wake event to the master device if the coherency action is taken;

the master device being responsive to the wake event to exit the power saving mode, wherein:

during performance of said data processing operations, the master device is configured to perform an access operation to access a semaphore stored in shared memory, performance of the access operation causing a current value of the semaphore to be stored in the cache, the shared memory being shared with at least one further master device within the coherent cache system, and the semaphore being used to maintain an ordering between one or more data processing operations performed by the master device and one or more data processing operations performed by the at least one further master device; and if the current value obtained by the access operation indicates a stall condition, the master device is configured to perform the wait for event operation.

2. A data processing apparatus as claimed in claim 1, wherein:

said coherency request is received in response to said at least one further master device seeking to update the semaphore, causing the coherency action to be taken in respect of the current value of the semaphore stored in the cache;

whereby the wake event circuitry is configured to issue the wake event to cause the master device to exit the power saving mode.

3. A data processing apparatus as claimed in claim 1, wherein:

the coherent cache system employs a write invalidate cache coherency protocol, such that if the coherency request received by the coherency handling circuitry is in response to a write operation performed by a further master device within the coherent cache system, the coherency action taken in response to detection of the identified data value in the cache is an invalidation coherency action resulting in invalidation of that data value in the cache; and the wake event circuitry is configured to issue the wake event to the master device if the invalidation coherency action is taken.

4. A data processing apparatus as claimed in claim 1, wherein:

the at least one further master device is configured to set the semaphore when a predetermined sequence of operations has been performed by the at least one further master device;

the current value obtained by the access operation indicates the stall condition unless the semaphore has been set;

whereby the master device is configured to enter the power saving mode until the semaphore is set by the at least one further master device.

5. A data processing apparatus as claimed in claim 1, wherein:

the semaphore is associated with a data structure in the shared memory, the semaphore controlling access to the data structure by the master device and said at least one further master device.

6. A data processing apparatus as claimed in claim 5, wherein the semaphore is one of:

a lock;
a counter;
a pointer.

7. A coherent cache system comprising:

a data processing apparatus as claimed in claim 1;
at least one further master device; and
a coherent interconnect to which the cache of said data processing apparatus is coupled and from which said coherency request is received.

8. A method of operating a data processing apparatus forming a portion of a coherent cache system, the data processing apparatus comprising a master device for performing data processing operations including a wait for event operation causing the master device to enter a power saving mode, and a cache coupled to the master device and arranged to store data values for access by the master device when performing said data processing operations, the method comprising the steps of:

responsive to a coherency request from another portion of the coherent cache system, employing coherency handling circuitry within the cache to detect whether a data value identified by the coherency request is present in the cache, and if so performing a coherency action in respect of that data value stored in the cache;

locally issuing, from wake event circuitry within the cache, a wake event to the master device if the coherency action is taken; and responsive to the wake event, causing the master device to exit the power saving mode, during performance of said data processing operations, performing an access operation to access a semaphore stored in shared memory and causing a current value of the semaphore to be stored in the cache, the shared memory being shared with at least one further master device within the coherent cache system, using the semaphore to maintain an ordering between one or more data processing operations performed by the master device and one or more data processing operations performed by the at least one further master device; and if the current value obtained by the access operation indicates a stall condition, performing the wait for event operation.

9. A data processing apparatus for forming a portion of a coherent cache system, comprising:

master means for performing data processing operations, including a wait for event operation causing the master means to enter a power saving mode;

cache means coupled to the master means for storing data values for access by the master means when performing said data processing operations;

coherency handling means within the cache means, responsive to a coherency request from another portion of the coherent cache system, for detecting whether a data value identified by the coherency request is present in the cache means, and if so for causing a coherency action to be taken in respect of that data value stored in the cache means; and wake event means within the cache means, responsive to the coherency handling means, for locally issuing a wake event to the master means if the coherency action is taken;

the master means for exiting the power saving mode in response to the wake event, wherein:

during performance of said data processing operations, the master means is configured to perform an access operation to access a semaphore stored in shared memory means, performance of the access operation causing a current value of the semaphore to be stored in the cache means, the shared memory means being shared with at least one further master means within the coherent cache system, and the semaphore being used to maintain an ordering between one or more data processing operations performed by the master means and one or more data processing operations performed by the at least one further master means; and if the current value obtained by the access operation indicates a stall condition, the master means is configured to perform the wait for event operation.

* * * * *